Oct. 4, 1932.  E. H. BRISTOL  1,880,755

RECORDER

Filed June 13, 1927

Inventor:
Edgar H. Bristol,
Attys.

Patented Oct. 4, 1932

1,880,755

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

RECORDER

Application filed June 13, 1927. Serial No. 198,315.

This invention relates to recording instruments and the object is to provide various improvements in means for supporting the pen whereby the instrument will be more convenient in use and accurate functioning thereof will be promoted.

My invention will be well understood by reference to the following description of the illustrative embodiment thereof shown by way of example in the accompanying drawing, wherein.

Figure 1:
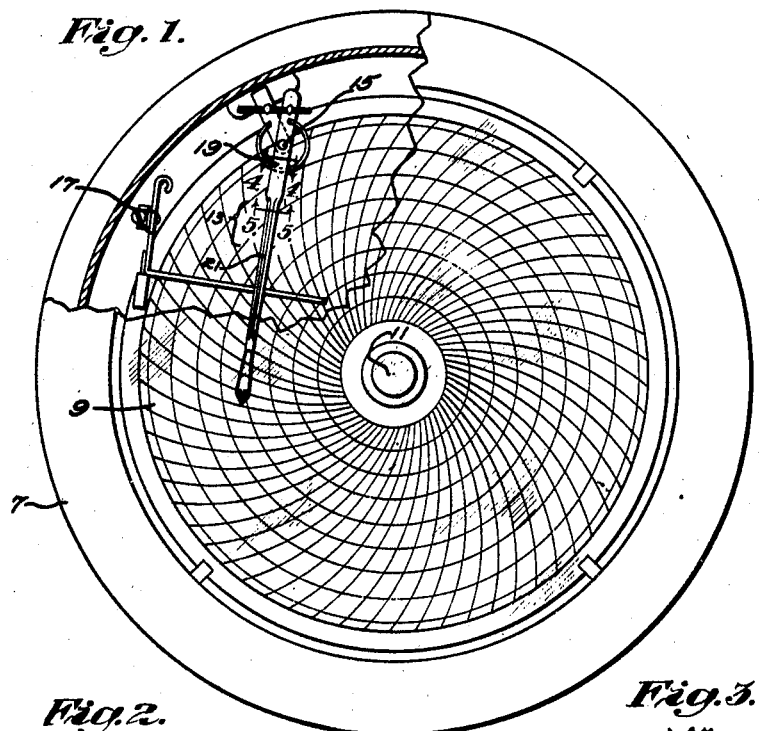
Fig. 1 is a front elevation of a recording instrument embodying my improvements, part of the door and glazing being broken away.
Figure 2:
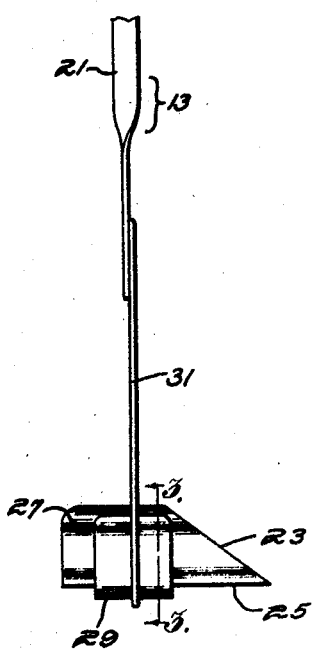
Fig. 2 is an enlarged side elevation of the lower portion of the pen arm with the pen.
Figure 4:
Figure 5:
Figure 3:
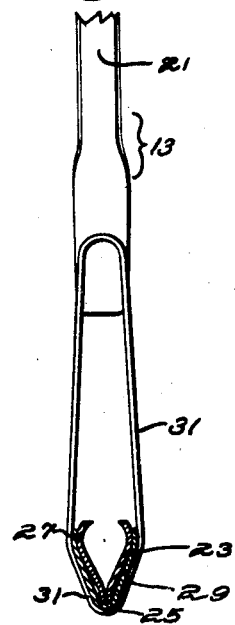
Fig. 3 is a section on the line 3—3 of Fig. 2.

Figs. 4 and 5 are sections on a still larger scale on the lines 4—4 and 5—5 of Fig. 1 respectively.

Referring to Fig. 1 of the drawing, I have there shown a recording instrument 7 of known type having the polar chart 9 adapted to be revolved by the spindle 11 of a clock movement. Swinging across the face of this chart is the pen arm, designated in Fig. 1 as a whole by the numeral 13, moving about a fixed center 15 at the edge of the chart. The construction illustrated by way of example embodies features which are fully described in my Patent No. 1,290,890, Jan. 14, 1919.

In the arrangement shown the pen is of the depending type and center 15 is near the upper edge of the case. The body of the pen arm may, as best shown by Figs. 2 to 5, comprise a flat strip of metal of such width as to be substantially inflexible laterally, that is, in a plane parallel to that of the chart, and the arm is adapted normally yieldingly to press the pen against the chart to record thereon. The pen arm may be flexed in a direction perpendicular to the chart when it is desired to lift the pen therefrom. For instance, the pen may be lifted off the chart by means of a pen lifter 17, the one here shown being like that described in said Patent No. 1,290,890 referred to.

To prevent the pen arm from becoming bent or crumpled through continued use, which might alter the length thereof so that it would not accurately follow the desired arc of the chart and which also would render it unsightly, it is preferably arranged to flex only in a relatively short zone remote from the pen and adjacent the center 15 and for this purpose the strip may be left flat for a relatively short distance at 19 while the major length of the body of the pen arm is substantially rigid. Herein this rigidity is effected by providing the remainder of the length thereof with a stiffening corrugation 21 (see Figs. 4 and 5). The flexibility of the pen arm is thus localized and distortion of the same is prevented.

The pen 23 is generally of channel form and may comprise the capillary channel 25 bevelled to provide a unitary point and having wing portions 27 rising from the flanges of the channel and providing an ink-receiving reservoir. The construction of pen illustrated is more fully disclosed in the patent to E. J. Watts, No. 1,447,582, March 6, 1923. The channel of the pen faces upwardly, the pen arm being of the depending type which, hanging down over the face of the chart, suspends the pen in marking position. To effect this the pen may be received in a channel-shaped holder 29 which provides an underriding support therefor and which is connected laterally of the pen to the main body of the pen arm so that the channel of the pen is unobstructed from above. Herein I have shown the holder 29 as secured in the bight of a long wire loop 31, the upper end of which is soldered to the strip which forms the body of the pen arm. The pen arm considered as a whole is thus open centrally adjacent its lower end for a considerable distance between the legs of the wire loop 31 and the channel of the pen faces and opens to this space.

In the use of an instrument of this type the pen must be cleaned from time to time and in accordance with the construction shown the channel is unobstructed for a substantial distance above the pen. Thus, a piece of blotting paper may be thrust through the central opening at the bottom of the pen arm between the legs of the loop 31 so that it may wipe through the channel of the pen, which is open at the back, from end to end quickly and thoroughly to clean the same. The arrangement also facilitates filling the pen with ink without danger of getting any on the pen arm.

The lower portion of the pen arm being substantially rigid by virtue of the corrugation 21 when the pen arm is flexed at 19 to raise the pen from the chart, the rigid portion finds a support on the arm of the pen lifter 17 and a comparatively firm resistance is offered which facilitates cleaning in the manner described.

I have described in detail the particular embodiment of my invention shown by way of example in the accompanying drawing. It is obvious that the construction may be widely varied while obtaining some or all of the advantages contemplated by the invention. The explicit nature of the description, therefore, is not to be taken as a definition of the scope of the invention but is to be understood merely as an explanation of the particular embodiment thereof shown in the drawing.

What I claim as new and desire to secure by Letters Patent I shall express in the following claims.

1. In a recording instrument a depending pen arm, a channeled pen having an open back, a channeled holder receiving the pen, said arm suspending said holder by connection to a side thereof leaving the space above the channel of the pen unobstructed for a substantial distance above the same to provide for ready access of a cleaning instrument to pass the edge of such through the pen.

2. In a recording instrument a pen arm hanging down over the chart and pivoted to swing substantially in a plane parallel thereto, the body thereof comprising a generally flat strip substantially inflexible in a plane parallel to the chart and normally adapted yieldingly to press against the chart a pen held thereby, a channeled pen, an underriding support for the pen having a connection lateral of the pen to the body of the arm and providing an unobstructed space above the channel of the pen for a substantial distance whereby ready access of a cleaning instrument to pass the edge of such through the pen is provided for.

3. In a recording instrument a depending pen arm pivoted to move over the chart and having adjacent said pivot and remote from the pen a relatively short zone of flexure in a direction perpendicular to the chart, means engaging the pen arm below said zone to raise and support the pen away from the chart, a channeled pen, an underriding support for the pen having a connection lateral of the pen to the body of the arm and providing an unobstructed space above the channel of the pen for a substantial distance whereby ready access of a cleaning instrument to pass the edge of such longitudinally through the pen is provided for.

4. In a recording instrument a pivoted pen arm to move over the chart thereof comprising a strip of metal lying flat in a relatively short zone adjacent said pivot and remote from the marking point and providing for flexure of the arm in a direction perpendicular to the chart and being corrugated throughout the major portion of its length for rendering that portion inflexible.

In testimony whereof, I have signed my name to this specification.

EDGAR H. BRISTOL.